United States Patent
Staats

(10) Patent No.: US 10,776,850 B2
(45) Date of Patent: Sep. 15, 2020

(54) AUTOMATED OPERATION OF AUTOMOBILE PARTS ESTORES WITH AUTOMATED SELECTION OF PARTS AND DYNAMIC PRICING

(71) Applicant: Glenn E. Staats, Austin, TX (US)

(72) Inventor: Glenn E. Staats, Austin, TX (US)

(*) Notice: Subject to any disclaimer, the term of this patent is extended or adjusted under 35 U.S.C. 154(b) by 457 days.

(21) Appl. No.: 15/593,824

(22) Filed: May 12, 2017

(65) Prior Publication Data

US 2018/0330420 A1 Nov. 15, 2018
US 2019/0188767 A9 Jun. 20, 2019

Related U.S. Application Data

(60) Provisional application No. 62/337,990, filed on May 18, 2016.

(51) Int. Cl.
*G06Q 30/06* (2012.01)

(52) U.S. Cl.
CPC ..... *G06Q 30/0627* (2013.01); *G06Q 30/0603* (2013.01)

(58) Field of Classification Search
CPC .............................. G06Q 30/06–08
USPC .............................. 705/26.1–27.2
See application file for complete search history.

(56) References Cited

U.S. PATENT DOCUMENTS

| 10,083,472 | B1* | 9/2018 | Schroder | G06Q 30/0623 |
| 2004/0158746 | A1* | 8/2004 | Hu | G06F 21/41 726/8 |
| 2004/0199575 | A1 | 10/2004 | Geller | |
| 2005/0125261 | A1* | 6/2005 | Adegan | G06Q 10/06 705/4 |
| 2005/0187834 | A1* | 8/2005 | Painter | G06Q 10/08 705/28 |
| 2006/0195461 | A1 | 8/2006 | Lo | |
| 2007/0219982 | A1* | 9/2007 | Piper | G06Q 30/0603 |
| 2009/0019008 | A1* | 1/2009 | Moore | G06Q 30/02 |
| 2009/0157523 | A1 | 6/2009 | Jones | |
| 2010/0010918 | A1 | 1/2010 | Hunt | |

(Continued)

OTHER PUBLICATIONS

Is there software that allows to auto fill marketplace fields for auto parts, Quora question, https://www.quora.com/Is-there-a-software-that-allows-to-auto-fill-Marketplace-fields-for-auto-parts, 2017 (Year: 2017).*

*Primary Examiner* — Ming Shui

(74) *Attorney, Agent, or Firm* — Kowert, Hood, Munyon, Rankin & Goetzel, P.C.

(57) ABSTRACT

Some embodiments relate to systems and methods for selection of auto parts with automatic part selection and dynamic pricing. A system may automatically connect to a plurality of auto parts electronic stores over a wide area network and receive user input specifying parts that the user desires to purchase. The user input may include vehicle information terms that may be mapped to an auto parts vocabulary particular to each respective auto parts electronic store. Required vehicle information and specific conditions for each auto parts electronic store may be automatically completed using the auto parts vocabulary particular to each auto parts electronic store and part/pricing information may be received from at least two of the auto parts electronic stores in response. At least a subset of the part/pricing information from the at least two auto parts electronic stores may be displayed.

20 Claims, 2 Drawing Sheets

(56) References Cited

U.S. PATENT DOCUMENTS

2011/0258084 A1 10/2011 Watts
2012/0136802 A1* 5/2012 McQuade .......... G06Q 30/0282
　　　　　　　　　　　　　　　　　705/347

* cited by examiner

AUTOMATED OPERATION OF AUTOMOBILE PARTS ESTORES WITH AUTOMATED SELECTION OF PARTS AND DYNAMIC PRICING

PRIORITY DATA

This application claims benefit of priority to U.S. Provisional Application Ser. No. 62/337,990, titled "Automated Operation of Automobile Parts eStores with Automated Selection of Parts and Dynamic Pricing", filed May 18, 2016, by Glenn E. Staats, which is hereby incorporated by reference in its entirety as though fully and completely set forth herein.

FIELD

The present application relates to network-based purchasing of auto parts, and more particularly to an Internet based system for purchasing auto parts with automatic part selection and dynamic pricing.

BACKGROUND

Consumers (retail customers) and automotive repair facilities, often referred to as service dealers (SD) purchase replacement parts for the repair of automobiles and trucks (vehicles) from parts stores located reasonably close to them. The Replacement Parts distributor have some combination (based on the size and their penetration of the market) of the primary store, sister stores (other like branded stores in the general geographic area), possibly (generally in larger markets) Super or Hub stores (which have larger inventories than most stores), and Warehouses. The combination of these facilities for a specific distributor will be referred to as the Network. Usually a consumer and/or a SD desire to repair a vehicle as soon as possible, and hence part availability is often the most important consideration in determining which distributor's network to buy from. If more than one distributor network can provide prompt delivery, then cost can become the most important consideration. For the purposes of this document the SD model will be used, but the retail customer model operates much the same.

Over the past decade, online parts catalogs have become more prevalent in the automobile service industry. Each auto parts distributor (e.g., O'Reilly, NAPA, Autozone, etc.) currently maintains an eStore that allows a SD to look up particular parts for a given repair (e.g., front disc pad replacement) and/or for a given service type (e.g., oil change). In addition, each online parts catalog relies at least partially on vocabulary and phrases particular to the auto part distributor to describe vehicle information relevant to selection of the particular part. Thus, the type of part (or parts) necessary for repair or service may be dependent on vehicle information (such as vehicle year, make, model, engine, and other specific conditions) that may be at least partially described in vocabulary particular to each distributor's catalogue. In addition, the SD may select the type of part(s) needed. Since there are thousands of types of parts, these parts are grouped in some combination of categories, subcategories, and part types (i.e. Filters and PVC Valves, Filters, Air Filter). Thus, a SD is preferably at least partially familiar with the vocabulary for each distributor in order to access and successfully use each distributor's eStore. The eStore taken in combination with other software to allow the selection of specific parts and the ordering of the selected parts, comprise the distributor's eStore. In addition, a distributor's eStore often has special sale information, labor rates and other information for the purchase of parts. Also, eStores are available for distributors that do not have their own eStore or their own catalogue.

A SD purchases parts from a number of sources. The industry generally refers to these distributors as the "first call", "second call", "third call", etc. The "first call" is the distributor that the SD is most likely to call for parts. The "second call" is the likely call if either the "first call" does not have the part in a primary store or the SD prefers some product line that are not stocked by the "first call", but are stocked by the "second call". The "third call" is the next distributor to call and so forth. The SD may be registered for many distributor's eStores and selects from this list to define his first call, second call, third call, etc. from which to order. This selected group of distributors defines a parts ordering network for the SD (distributor's network). Thus, to compare availability and/or price across auto part distributors, the SD would be required to enter their User ID, Password, year, make, model, engine (sometimes), category, subcategory, and part type into each eStore in the distributor's network. In addition, the vocabulary and structure of the lists that are provided on each eStore vary widely. In other words, the SD would need to log-in to each online parts catalog and fill in a series of fields related to vehicle information using the vocabulary particular to the respective dealer's eStore. Then, the SD would have to answer a series of questions regarding the category, subcategory, and part type(s) that were needed for a given repair. These items would also vary in form and verbiage by distributor. In addition, the SD may have to review various "specific conditions" (e.g., front wheel drive versus all-wheel drive versus four wheel drive, automatic versus manual transmission, engine size, and so forth) in each eStore and also determine which grade of part (e.g., economy, national brand, professional brand) the SD would prefer.

Thus, given the time requirements to locate parts and then compare the located parts within the eStores, the most prominent (e.g., 70-80% of the time) method of locating parts remains a SD calling a preferred auto parts distributor and requesting parts based on the part required and vehicle information (e.g., make, model, engine, and specific conditions). If the preferred distributor has immediate (e.g., within 30 minutes to 1 hour) availability, the SD will often order the part independent of price. However, for more expensive parts the SD could "price shop" to determine the least cost option. Almost always, a SD will search other distributors if availability for fast delivery is an issue.

Improvements in the field are desirable in order to provide an efficient online eStore for automotive replacement parts.

SUMMARY OF THE INVENTION

At least some embodiments have two main aspects—(1) the entry of required information only once enables the use of multiple distributor eStores simultaneously and (2) consolidation of part selection across eStores to allow availability, quality, and cost comparisons.

In the first aspect, a technique for consolidation of eStores includes a single electronic platform that allows:

1) The launching of an application that logs onto the standardizing eStore and then the launching of the individual eStores of each distributor in the network. Thus, the SD's electronic platform would open multiple browsers each operating a single distributor's eStore and one additional eStore that controls the delivery of standardized data to the application program which electronically enters the answers to each eStore questions required to generate each distributors specific list of parts. Thus, this invention involves having one application program on a SD's electronic platform operating a multiple number of eStores simultaneously.

2) A common entry scheme of vehicle information (e.g., vehicle make, model, engine, and specific conditions) and then maps the vehicle information from the common entry scheme to the particular vocabulary and phrases for each auto part distributor. In addition, the automatic entry of this converted data specific to each distributor's eStore is required. Thus, a part (or parts) for a particular repair may be located in each eStore with the operation of a single eStore by the SD.

In a second aspect, the platform may display availability and pricing information for each eStore that a SD has a license to access. And where possible the system should eliminate parts that do not fit the SD's criteria Thus, based on the single entry of vehicle information and specific conditions, the SD may see price and availability of the part (or parts) for a particular repair from auto part distributors that provide the eStore to the SD.

In order for a distributor's eStore to operate on a SDer's electronic system, the distributor's central server system communicates the data that is to appear on the SDer's system to that user system. That data can be digitized separately from the actual display on the SDer's system, the actual display turned off, and organized in order to determine specific questions that are be answered by the user on his system. In turn, the question can be electronically answered by the user's system. For example, when logging onto a given eStore, the eStore will ask the user to enter a User ID and Password. The user's system can choose this data from a stored matrix that contains the User IDs and Passwords for each distributor member of the SD's network, the electronic system can then supply the correct answers to the Distributor's system. Hence, exactly duplicating the manual entry that would normally take place between the SD and the distributor's system. The SD's electronic system is essentially a "virtual SD" user on the SD's system. The virtual SD can then properly answer additional questions from the eStore to navigate to the appropriate location on the eStore to undertake the next function required. Each eStore can have different techniques for this navigation, but there are a finite number of techniques that are available to the eStore. Methods have been programmed to duplicate each of these techniques. The correct one is chosen by the SD's virtual SD. Many of the same methods are used by different eStores. The eStoreConnectPlus site may choose the correct method to use in each step for each eStore. At most steps the virtual SD may select an answer from a list of data provided by the eStore. The standardized terminology that was selected in eStorePlusPlus by the SD can then be auto mapped to the data from the eStore list. The virtual SD then selects the correct answer to the question that was being asked by the distributor's eStore. For example, after logging onto a given distributor's eStore the SD system navigates (virtually) by selecting that the SD wants to enter the year that the vehicle was built. The distributor's eStore then provides a list of acceptable years and the virtual SD selects the year that was entered by the SD in eStoreConnectPlus. Next a list of makes is provided to the SD and the process is repeated. This process is continued through the entry of model, submodel, engine, category, subcategory, part type, and the resulting parts list on the distributors eStore. This process is repeated on all eStores in the SD's network. All distributors parts lists are then available to the SD's system. This data can be reformatted by the SD eStoreConnectPlus for presentation to the SD. Also the data can be analyzed by the SD system in order to determine availability, cost, quality of a part, etc. Different methods have been provided by eStoreConnectPlus for these types of analysis. eStoreConnectPlus can also analyze the data to determine if any additional questions have to be answered in order to select the correct part, the number to order, and distributor and distributor location from which to purchase the part. The ultimate goal is to provide the questions such that the system can determine the exact part to purchase and the distributor from which to purchase the part. After all parts are selected, eStoreConnectPlus can then enter orders to various distributors from whom the SD wants to purchase the parts.

The auto mapping of make, model, submodel, engine, category, subcategory, and part is an integral portion of this system. The techniques are varied and utilize word analysis including all of the words in a given phrase, the location of the words in a phrase, and previous uses of the words in other combinations. Also, the placement of the words in the phrase may be altered by type of word. For example, a position word like front, rear, right, or left is moved to the front of the phrase for all distributors and for eStoreConnectPlus. Also the methods use key words and their position in the phrase to determine like phrases. For example, in a throttle position control sensor versus a throttle position control sensor connector the word sensor would be defined as the base phrase type (it is a sensor) while in the second phrase the connector would be defined as the base phrase type (it is a connector) and sensor would be defined as a modifier. Also, the words throttle and control would be modifiers in both phases. In addition, industry abbreviations and terms are integrated into the mapping methods. All words and phrases are first standardized between the distributors, so accurate mappings can be made. For example, if a given distributor uses Chevy as a make, it will be standardized to Chevrolet.

BRIEF DESCRIPTION OF THE DRAWINGS

A better understanding of the present subject matter can be obtained when the following detailed description of the embodiments is considered in conjunction with the following drawings.

Figure 1:
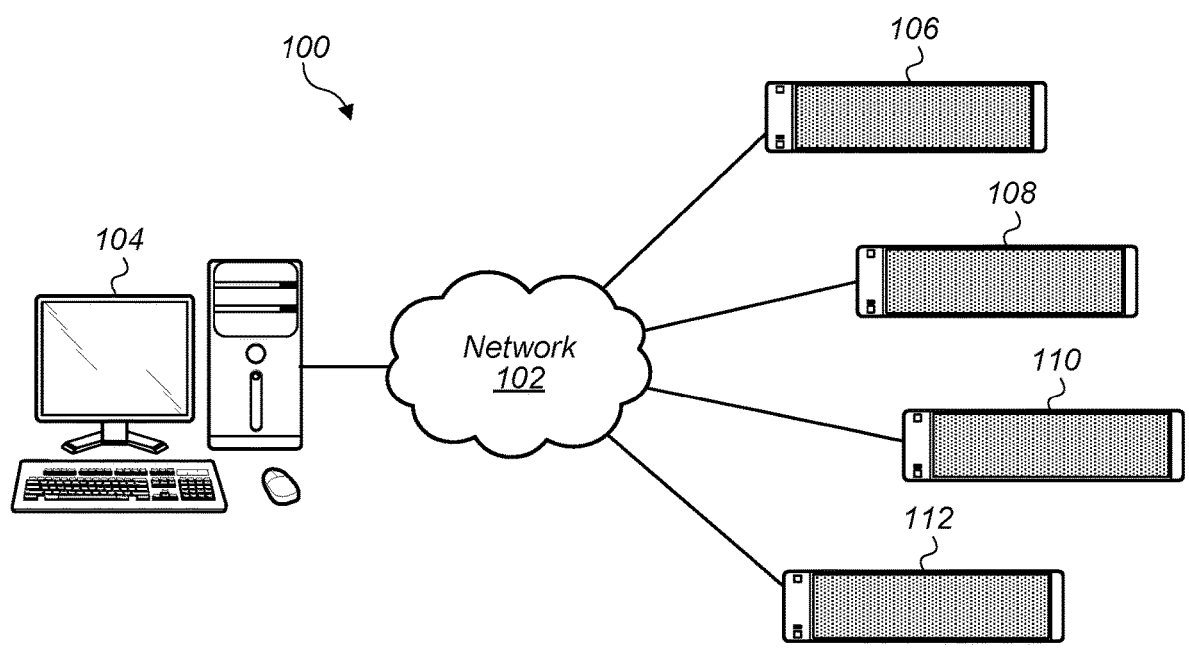
FIG. 1 illustrates an example system which may implement embodiments of the invention.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terminology

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Mobile Device (or Mobile Station)—any of various types of computer systems devices which are mobile or portable and which performs wireless communications using WLAN communication. Examples of mobile devices include mobile telephones or smart phones (e.g., iPhone™, Android™-based phones), and tablet computers such as iPad™ Samsung Galaxy™, etc. Various other types of devices would fall into this category if they include Wi-Fi or both cellular and Wi-Fi communication capabilities, such as laptop computers (e.g., MacBook™), portable gaming devices (e.g., Nintendo DS™ PlayStation Portable™, Gameboy Advance™, iPhone™), portable Internet devices, and other handheld devices, as well as wearable devices such as smart watches, smart glasses, headphones, pendants, earpieces, etc. In general, the term "mobile device" can be broadly defined to encompass any electronic, computing, and/or telecommunications device (or combination of devices) which is easily transported by a user and capable of wireless communication using WLAN or Wi-Fi.

Wireless Device (or Wireless Station)—any of various types of computer systems devices which performs wireless communications using WLAN communications. As used herein, the term "wireless device" may refer to a mobile device, as defined above, or to a stationary device, such as a stationary wireless client or a wireless base station. For example a wireless device may be any type of wireless station of an 802.11 system, such as an access point (AP) or a client station (STA or UE). Further examples include televisions, media players (e.g., AppleTV™, Roku™, Amazon FireTV™, Google Chromecast™, etc.), refrigerators, laundry machines, thermostats, and so forth.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, e.g., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Embodiments

FIG. 1 illustrates an example system which may implement embodiments of the invention. As shown, a service dealer (SD), or a customer, may use computer 104 to launch software which implements the methods described herein, and which may be referred to as e-StoreConnectPlus or as an "auto part ordering platform". The computer 104 has various standard components such as a processor, memory medium, network connectivity, etc., and is coupled to a wide area network 102, such as the Internet. Once launched, the software may access eStores operated by two or more different distributors. For example, each auto parts distributor may operate at least one server of servers 106—112 which hosts their respective eStore and are also coupled to the network 102. As one example, server 106 may host an eStore from O'Reilly, server 108 may host an eStore of NAPA, server 110 may host an eStore of Autozone, and server 112 may host an eStore of another auto parts distributor. The e-StoreConnectPlus software may access part/pricing information from each respective eStore Server 106—112 and use this information to present an improved purchasing experience to the user, e.g., the SD or the customer. The operation of the e-StoreConnectPlus software is provided in greater detail below.

In one aspect, each time a SD initializes the single auto part ordering platform (e.g., e-StoreConnectPlus), the platform may automatically log the SD into each eStore for which the SD has a license to access. In addition, to perform a parts search, the single platform may receive input from the SD (i.e., user) regarding the one or more parts to be purchased and then may automatically load each eStore and fill in required vehicle information and specific conditions based on a mapping from vehicle information terms used for the single platform to a vocabulary particular to each eStore. This is then repeated for each eStore in the distributor's network. The single platform may then retrieve the parts information and display the price and availability information to the SD. The display of price and availability (e.g., local or at warehouse, available within hours or next day) may be through a comparison window.

In some aspects, the SD may be able to select preferences such as preferred distributor, preferred part grade (or level) (e.g., economy, professional, national brand), sorting of distributors based on price or availability, etc. In some aspects, a distributor may have preferential treatment on the comparison display. For example, the distributor may have a price of a part automatically adjusted to match the lowest price for a comparable part available from the other distributors in the network. This feature is referred to as "Lowest price guaranteed." There are numerous data elements required for this price change in order to help control gross margin. In other words, a primary distributor and dynamically alter the price charged to a given SD based on quality, availability, and the pricing of other distributors (Dynamic Pricing). As another example, parts from the distributor may be displayed prior to the comparison window.

Figure 2:
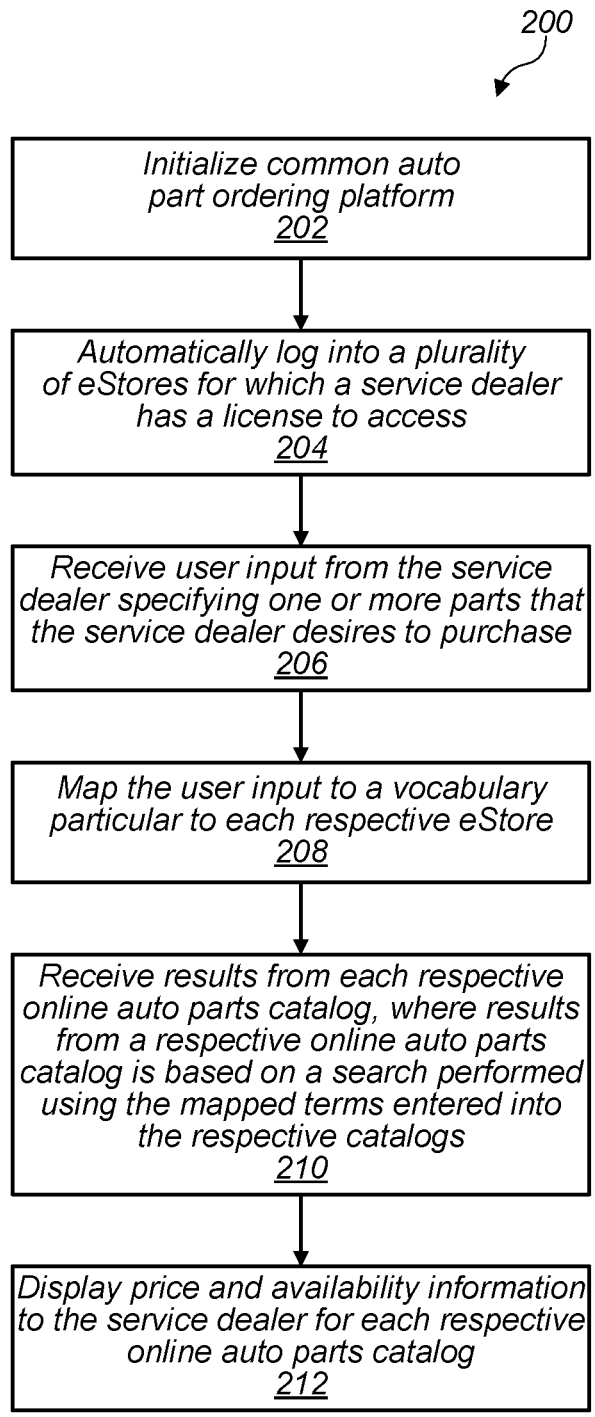
FIG. 2 is a flowchart diagram illustrating one embodiment of the invention.

FIG. 2 is a flowchart diagram illustrating one embodiment of the invention. The flowchart diagram shown in FIG. 2 may be used in conjunction with any of the systems or devices shown in FIG. 1, among other devices. In various embodiments, some of the elements shown may be performed concurrently, in a different order than shown, or may be omitted. Additional elements may also be performed as desired.

At step 202 the common auto part ordering platform may be started (or initialized) on computer system 104, e.g., by a service dealer. Here the term "service dealer" refers to a person or company who is involved with performing service on a vehicle, such as replacement of one or more auto parts within the vehicle. It is presumed that the SD has an auto repair job which requires at least one auto part to be purchased. Accordingly, the SD may launch the common auto part ordering platform on a computer.

At step 204 the common auto part ordering platform may automatically log into each eStore for which the SD has a license to access. The common auto part ordering platform may store log-in information for each eStore website, such as user name and password for each. In 204 the auto part ordering platform may use its stored log-in information to log-in and gain electronic access to each respective eStore, e.g., on servers 106-112. This operation of logging into each eStore may happen automatically, i.e., without any further user input required to perform the log-in, e.g., without requiring user input to manually enter user name and password information, etc.

At 206 the common auto part ordering platform may receive user input from the SD specifying one or more parts that the SD desires to purchase. The common auto part ordering platform may include or specify a common nomenclature (common vehicle information terms) for auto parts which is generic to auto part names from various auto parts companies. Thus the user input may be received using this common generic nomenclature. The common auto part ordering platform may display portions of this common auto part nomenclature as selections from which the user may choose when the user is providing input on parts to order. The selections may include or allow the SD to input variables such as vehicle make, vehicle model, and vehicle trim level, as well as options and or specific conditions which may be relevant in specifying which part or parts are necessary for a repair.

At 208 the common auto part ordering platform may map the user input (e.g., the common vehicle information terms (the common nomenclature) used for the single platform) to a vocabulary particular to each respective eStore. The common auto part ordering platform may then automatically fill in required vehicle information and specific conditions for each eStore for which the SD has a license to access using the vocabulary particular to each eStore. Thus the common auto part ordering platform may receive a generic term entered into the platform and map this generic term to a first auto part term for a first online auto part catalog and map this generic term to a second auto part term for a second online auto part catalog. As an example, the SD may require an air filter for a particular service. Thus, the common auto part ordering platform may receive user input specifying a vehicle make, model, and trim level, as well as optional features such as drive type (e.g., two wheel, four wheel, or all-wheel drive) and engine size (e.g., 4.8 liter, 5.7 liter, etc.). Once the user input is received, the common auto part ordering platform may map the user input to fields as required by a first online auto part catalog where engine size and drive type are specific conditions and to a second online auto part catalog where engine size and drive type are messages appearing in a description of the air filter. Additionally, the common auto part ordering platform may map the user input to a third online auto part catalog where engine size and drive type are specified via pop-up windows and require selection from various presented options.

In 210 the various online auto parts catalogs may each perform a search based on the mapped terms entered into the respective catalogs, and these online auto parts catalogs may return results based on these searches. The results may include multiple options for parts based on part grade (e.g., national brand, professional brand, economy brand) as well as price, location (e.g., local store or warehouse), and availability (e.g., same day, next day, within a specific time frame such as 1 or 2 hours).

In 212 the common auto part ordering platform may then retrieve the parts information from each of the eStores based on the mapped search terms and display the price, location, and availability information to the service dealer. The display of price and, location, and availability may be through a comparison window. Thus the common auto part ordering platform may obtain price information for parts from each of a plurality of different auto parts catalogs (which may utilize different terms for the same part) and present this part information on the display. This allows the SD to easily compare prices for the same part across a range of different eStores.

In at least some embodiments, an auto parts dealer may have a contractual arrangement with the common auto part ordering platform such that a price of one of its parts is displayed more prominently, such as in a higher relative position, than competing parts from other auto parts dealers. As another option, a first auto parts dealer may have a contractual arrangement with the common auto part ordering platform such that a price of one of its parts is automatically adjusted to be at or just below the lowest price of other auto parts dealers, in order to make it more likely that the SD orders the part from the first auto parts dealer.

Embodiments of the present disclosure may be realized in any of various forms. For example, some embodiments may be realized as a computer-implemented method, a computer-readable memory medium, or a computer system In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., wireless device (or wireless station) or computer system) may be configured to include a processor (or a set of processors) and a memory medium, where the memory medium stores program instructions, where the processor is configured to read and execute the program instructions from the memory medium, where the program instructions are executable to cause the device to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A non-transitory computer-accessible memory medium comprising program instructions for implementing an electronic auto parts store, wherein the program instructions are executable to:

automatically connect to a plurality of auto parts electronic stores over a wide area network;

receive user input from a user specifying one or more parts that the user desires to purchase, wherein the user input comprises vehicle information and specific conditions, including at least a year a vehicle was built, a vehicle make, a vehicle model, and a part type;

map the vehicle information and specific conditions to an auto parts vocabulary particular to each respective auto parts electronic store of the plurality of auto parts electronic stores, including, for each respective auto parts electronic store, mapping vehicle information and specific conditions received from the user input to fields particular to each respective auto parts electronic store, wherein the fields include specific conditions associated with the one or more parts, messages appearing in a description of the one or more parts, or options for the one or more parts presented in pop-up windows requiring selection;

automatically complete, at each respective auto parts electronic store of the plurality of auto parts electronic stores, required vehicle information and specific conditions for each auto parts electronic store based on the mapping of the vehicle information and specific conditions to the auto parts vocabulary particular to each auto parts electronic store;

receive part/pricing information from at least two of the plurality of auto parts electronic stores in response to said automatically completing; and display at least a subset of the part/pricing information from the at least two of the plurality of auto parts electronic stores after said receiving.

2. The non-transitory computer-accessible memory medium of claim 1, wherein to automatically connect to the plurality of auto parts electronic stores, the program instructions are further executable to:

automatically log into each auto parts electronic store using respective log-in information stored for each auto parts electronic store, wherein, for each auto parts electronic store, the respective log-in information comprises one or more of a respective user name and a respective password.

3. The non-transitory computer-accessible memory medium of claim 1, wherein the vehicle information and specific conditions are specified via a common nomenclature for auto parts which is generic to the auto parts vocabulary particular to each respective auto parts electronic store, and wherein the common nomenclature integrates industry abbreviations and terms into the mapping via standardization of words and phrases between each respective auto parts electronic store.

4. The non-transitory computer-accessible memory medium of claim 3, wherein to receive user input from the user specifying one or more parts, the program instructions are further executable to:

display portions of the common nomenclature for auto parts as selections for the user.

5. The non-transitory computer-accessible memory medium of claim 1, wherein the part/pricing information comprises one or more of:
a part grade;
a part price;
a part location; or
a part's availability.

6. The non-transitory computer-accessible memory medium of claim 1, wherein to display at least the subset of the part/pricing information from the at least two of the plurality of auto parts electronic stores after said receiving, the program instructions are further executable to:

arrange the display of at least the subset of the part/pricing information based in part on a preference of a first respective auto parts electronic store over a second respective auto parts electronic store.

7. The non-transitory computer-accessible memory medium of claim 1, wherein to display at least the subset of the part/pricing information from the at least two of the plurality of auto parts electronic stores after said receiving, the program instructions are further executable to:

adjust part/pricing information of a first respective auto parts electronic store based on part/pricing information received from a second respective auto parts electronic store; and display the adjusted part/pricing information of the first respective auto parts electronic store and the part/pricing information received from a second respective auto parts electronic store.

8. A system, comprising:

a memory; and at least one processor in communication with the memory, wherein the at least one processor is configured to:

automatically connect to a plurality of auto parts electronic stores over a wide area network;

receive user input from a user specifying one or more parts that the user desires to purchase, wherein the user input comprises vehicle information terms;

map the vehicle information terms to an auto parts vocabulary particular to each respective auto parts electronic store, wherein the mapping is based on word analysis of phrasing of the vehicle information terms, including word analysis of all words in the phrasing, location of words in the phrasing, previous use of words in other phrasings, word type, key words, or relative key word position in the phrasing;

automatically complete required vehicle information and specific conditions at each auto parts electronic store using the auto parts vocabulary particular to each auto parts electronic store based on the mapping of the vehicle information and specific conditions to fields particular to each respective auto parts electronic store, wherein the fields comprise one or more of specific conditions associated with the one or more parts, messages appearing in a description of the one or more parts, or options for the one or more parts presented in pop-up windows requiring selection;

receive part/pricing information from at least two of the plurality of auto parts electronic stores in response to said automatically completing; and display at least a subset of the part / pricing information from the at least two of the plurality of auto parts electronic stores after said receiving.

9. The non-transitory computer-accessible memory medium of claim 1, wherein specific conditions include one or more of engine size, drive type, or transmission type.

10. The non-transitory computer-accessible memory medium of claim 1, wherein the vehicle information and specific conditions are entered via standardized terminology selected by the user.

11. The non-transitory computer-accessible memory medium of claim 1, wherein, to automatically connect to the plurality of auto parts electronic stores over the wide area network, the program instructions are further executable to:

open a plurality of browsers, each browser of the plurality of browsers corresponding to a respective auto parts electronic store; and open an additional browser, wherein the user input specifying one or more parts that the user desires to purchase is received via the additional browser.

12. The non-transitory computer-accessible memory medium of claim 1, wherein, to automatically complete required vehicle information and specific conditions for each auto parts electronic store using the auto parts vocabulary particular to each auto parts electronic store based on the mapping of the vehicle information and specific conditions to fields particular to each respective auto parts electronic store, the program instructions are further executable to, for each respective auto parts electronic store:

automatically select answers to questions presented by the respective auto parts electronic store, wherein the answers are based on the mapping, wherein the questions are associated one or more of a year a vehicle was built, a model of the vehicle, a submodel of the vehicle, or an engine of the vehicle.

13. The non-transitory computer-accessible memory medium of claim 12, wherein the questions are further associated one or more of a category, a subcategory, or a part type.

14. The system of claim 8, wherein to automatically connect to the plurality of auto parts electronic stores, the at least one processor is further configured to:

automatically log into each auto parts electronic store using respective log-in information stored for each auto parts electronic store, wherein, for each auto parts electronic store, the respective log-in information comprises one or more of a respective user name and a respective password.

15. The system of claim 8, wherein the vehicle information terms are specified via a common nomenclature for auto parts which is generic to the auto parts vocabulary particular to each respective auto parts electronic store; and wherein to receive user input from the user specifying one or more parts, the at least one processor is further configured to display portions of the common nomenclature for auto parts as selections for the user.

16. The system of claim 8, wherein the part/pricing information comprises one or more of:

a part grade;

a part price;

a part location; or a part's availability.

17. The system of claim 8, wherein to display at least the subset of the part/pricing information from the at least two of the plurality of auto parts electronic stores after said receiving, the at least one processor is further configured to:

arrange the display of at least the subset of the part/pricing information based in part on a preference of a first respective auto parts electronic store over a second respective auto parts electronic store.

18. The system of claim 8, wherein to display at least the subset of the part/pricing information from the at least two of the plurality of auto parts electronic stores after said receiving, the at least one processor is further configured to:

adjust part/pricing information of a first respective auto parts electronic store based on part/pricing information received from a second respective auto parts electronic store; and display the adjusted part/pricing information of the first respective auto parts electronic store and the part/pricing information received from a second respective auto parts electronic store.

19. A method for automatic selection auto parts, comprising:
- automatically connecting, by a processor, to a plurality of auto parts electronic stores over a wide area network;
- receiving, by the processor, user input from a user specifying one or more parts that the user desires to purchase, wherein the user input comprises vehicle information terms;
- mapping, by the processor, the vehicle information terms to an auto parts vocabulary particular to each respective auto parts electronic store, including integrating industry abbreviations and terms into the mapping via standardization of words and phrases between each respective auto parts electronic store;
- automatically completing, by the processor, required vehicle information and specific conditions at each auto parts electronic store using the auto parts vocabulary particular to each auto parts electronic store, including mapping the vehicle information and specific conditions to fields particular to each auto parts electronic store, wherein the fields comprise two or more of specific conditions associated with the one or more parts, messages appearing in a description of the one or more parts, or options for the one or more parts presented in pop-up windows requiring selection;
- receiving, by the processor, part/pricing information from at least two of the plurality of auto parts electronic stores in response to said automatically completing; and
- displaying, by the processor, at least a subset of the part/pricing information from the at least two of the plurality of auto parts electronic stores after said receiving.

20. The method of claim 19,
- wherein automatically connecting to the plurality of auto parts electronic stores comprises:
  - automatically logging into, by the processor, each auto parts electronic store using respective log-in information stored for each auto parts electronic store, wherein, for each auto parts electronic store, the respective log-in information comprises one or more of a respective user name and a respective password.

* * * * *